United States Patent [19]

Krosoczka et al.

[11] Patent Number: 4,545,564
[45] Date of Patent: Oct. 8, 1985

[54] VALVE

[76] Inventors: Joseph D. Krosoczka, 10 Brookline St., Worcester, Mass. 01603; Carl Cervini, 37 Juniper La., Holden, Mass. 01520

[21] Appl. No.: 475,548

[22] Filed: Mar. 15, 1983

Related U.S. Application Data

[63] Continuation-in-part of Ser. No. 416,503, Sep. 10, 1982, abandoned.

[51] Int. Cl.[4] ................................ F16K 5/06
[52] U.S. Cl. ................................ 251/315; 251/317
[58] Field of Search ................................ 251/315, 317

[56] References Cited

U.S. PATENT DOCUMENTS

| 3,490,734 | 1/1970 | Freeman . | |
|---|---|---|---|
| 3,501,128 | 3/1970 | Pool | 251/315 |
| 3,556,473 | 1/1971 | Scaramucci | 251/315 |
| 3,584,833 | 6/1971 | Grenier . | |
| 3,698,684 | 10/1972 | Grenier . | |
| 3,794,291 | 2/1974 | Suyama . | |
| 3,807,692 | 4/1974 | Usab et al. . | |
| 3,819,149 | 6/1974 | Kinder . | |
| 3,819,150 | 6/1974 | Kajrup . | |
| 4,177,832 | 12/1979 | Price | 251/315 |

FOREIGN PATENT DOCUMENTS

| 2909106 | 9/1979 | Fed. Rep. of Germany | 251/315 |
|---|---|---|---|
| 1240933 | 7/1971 | United Kingdom | 251/315 |
| 1246076 | 9/1971 | United Kingdom | 251/315 |

Primary Examiner—Martin P. Schwadron
Assistant Examiner—James R. Shay
Attorney, Agent, or Firm—Blodgett & Blodgett

[57] ABSTRACT

Valve in which a flow-control ball and two conical seals are enclosed in a unitary housing, the housing being formed from a tube of malleable metal, the tube being formed to provide two opposed conical portions after the elements have been inserted in the tube.

2 Claims, 9 Drawing Figures

VALVE

REFERENCE TO COPENDING APPLICATIONS

This is a continuation-in-part of patent application Ser. No. 416,503, filed Sept. 10, 1982 now abandoned.

BACKGROUND OF THE INVENTION

One of the outstanding additions to technology over the last few years has been the development of the practical ball valve. Although the concept of a ball valve goes back to ancient times, it has only become a practical device since the development of polymer materials for seals that are capable of resisting the action of the ball and the liquids contained in the system. Because of the necessity of good sealing against the ball surface, such valves have necessarily been fairly expensive and do not easily adapt themselves to use in domestic water systems and the like where price is a limiting factor. Attempts in the past to develop an inexpensive ball valve for such purposes have been less than successful, mainly because of the cost of manufacture. These and other difficulties experienced with the prior art devices have been obviated in a novel manner by the present invention.

It is, therefore, an outstanding object of the invention to provide a ball valve which can be manufactured inexpensively on conventional machinery and with a minimum of machining.

Another object of this invention is the provision of a ball valve in which the housing is formed around the ball and it seals by the use of a standard press.

A further object of the present invention is the provision of a ball valve in which the housing is of unitary construction, whereby the possibility of leakage is unlikely.

It is another object of the instant invention to provide a ball valve which is simple in construction, which is inexpensive to manufacture, and which is capable of a long life of useful service with a minimum of maintenance.

A still further object of the invention is the provision of a ball valve for domestic use, which valve can be readily inserted in a copper tube system by a simple soldering process.

It is a further object of the invention to provide a ball valve which is resistant to damage from excessive heat to permit soldering close to the valve.

With these and other objects in view, as will be apparent to those skilled in the art, the invention resides in the combination of parts set forth in the specification and covered by the claims appended hereto.

SUMMARY OF THE INVENTION

The invention consists of a valve having a main housing with a central cavity, an inlet passage at one end of the cavity and an outlet passage at the opposite end of the cavity, and first and second inner frusto-conical surfaces connecting the inlet and outlet passages, respectively, to the cavity. First and second seals of elastomeric material have first and second outer frusto-conical surfaces for engaging the first and second inner frusto-conical surfaces, respectively, and have opposed ball seats. A flow control ball is located in the cavity between the first and second seals in engagement with the ball seats.

The invention also consists of a method of manufacturing a ball valve comprising the steps of preparing a tube of malleable metal having an internal diameter greater than a desired inlet and outlet passage diameter, inserting a first sealing element, a flow control ball, and a second sealing element in the center of the tube, each of the sealing elements having an outwardly facing frusto-conical surface, and forming the tube to reduce the diameter of the end portions to form opposed frusto-conical internal surfaces that match and engage the outwardly facing frusto-conical surfaces to clamp the sealing elements and the ball between them.

The invention further consists of apparatus for forming a malleable tube into a valve housing, comprising two dies. Each die has a bore of small diameter to produce on the housing an end portion of small diameter and a bore of large diameter substantially equal to the outside diameter of the tube, and a frusto-conical transition bore.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
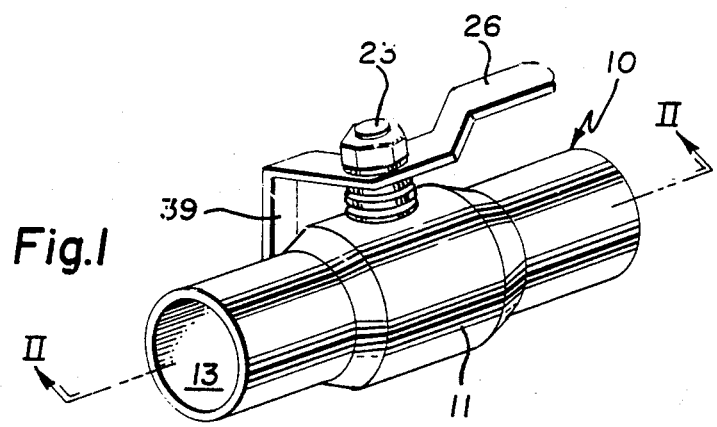
FIG. 1 is a perspective view of a ball valve incorporating the principles of the present invention.

Referring first to FIG. 1, wherein are best shown the general features of the invention, it can be seen that the valve, indicated generally by the reference numeral 10, is provided with a unitary housing 11 and an inlet passage 13. Extending from the housing is a stem 23 to which is attached an actuating handle 26 having a leg 39.

Figure 2:
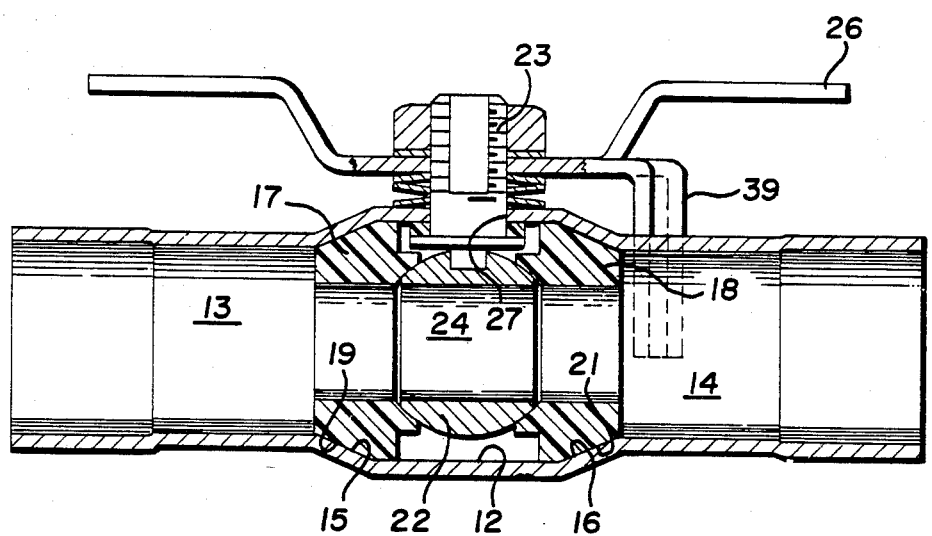
FIG. 2 is a vertical sectional view of the valve taken on the line II—II of FIG. 1.

Referring next to FIG. 2, which shows the details of the valve, it can be seen that the main housing 11 is provided with a central cavity 12 with the inlet passage 13 leading from the exterior to the cavity and an outlet passage 14 leading from the cavity to the exterior. The cavity 12 has opposed internal frusto-conical interior surfaces 15 and 16 which are aligned with the inlet and outlet passages 13 and 14, respectively. Two sealing elements 17 and 18 are located in the cavity 12. The seal 17 has an external frusto-conical surface 19 which mates with the frusto-conical surface 15 of the cavity. Similarly, the sealing element 18 is provided with an external frusto-conical surface 21 which mates with the frusto-conical surface 16 of the cavity. A flow-control ball 22 having a bore 24 is located in the cavity between the sealing elements 17 and 18 and is pressed tightly between them. The housing 11 is formed of a malleable metal, such as copper, and the sealing elements 17 and 18 are formed from an elastomer, such as Teflon. A stem 23 is keyed to the ball 22 and extends externally of the housing. A handle 26 is keyed to the stem 23, so that the turning of the stem by means of the handle 26 causes the ball 22 to rotate from an open position (as shown in FIG. 2) in which the bore 24 connects the inlet passage 13 to the outlet passage 14 to a closed position (shown in FIG. 4) in which the bore 24 does not connect the two passages.

Figure 3:
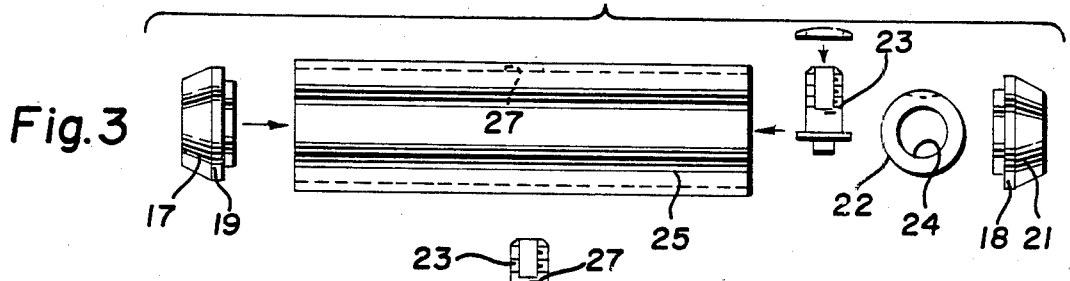
FIG. 3 is an exploded view showing the elements before assembly.

As is evident in FIG. 3, the manufacture of the valve begins with the selection of a straight copper tube having an internal diameter which is greater than the desired final diameter of the inlet passage 13 and the outlet passage 14. The drawing also shows the various other elements of the valve, including the sealing element 17, the sealing element 18, the ball 22, and the stem 23.

Figure 4:
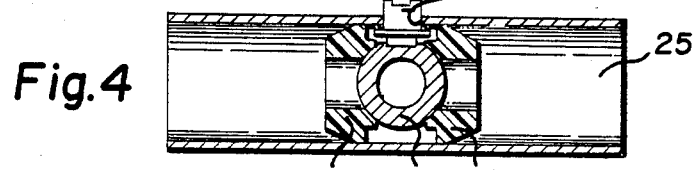
FIG. 4 shows the condition of the valve after the elements have been inserted in the basic tube.

The second step of the method (shown in FIG. 4) involves inserting the elements within the tube. It can be seen that the tube 25 is provided with a central aperture 27 and the stem 23 is inserted first into that aperture with the outer end extending radially from the tube. One of the sealing elements 17 or 18 is inserted into the tube from one end. The ball is then inserted into the tube so that it seats against the sealing element and keyed to the stem. Following that, the other sealing elements is passed into the tube from opposite end, so that it seats against the ball 22. It is possible to do this, of course, because the tube has an inner diameter almost exactly similar to the greatest diameter of the sealing elements 17 and 18. The assemblage at that stage appears as shown in FIG. 4.

Figure 5:
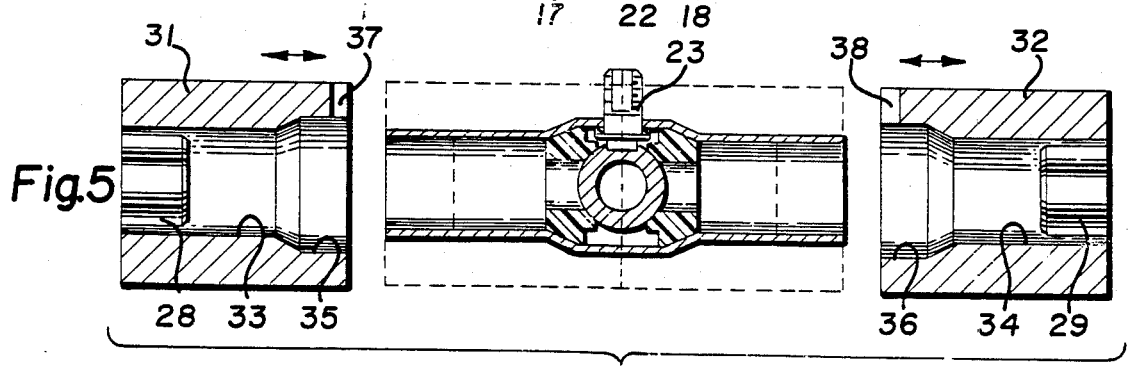
FIG. 5 shows the use of forming dies to shape the tube into the housing.

Finally, as shown in FIG. 5, two forming dies 31 and 32 are inserted over the assemblage and pressed together with considerable pressure. The pressing takes place in a conventional press. The die 31 has a bore 33 which is smaller than the diameter of the tube 25, while it is also provided with a counterbore 35 which is larger than the original starting tube 25. Between the two bores is a conical intermediate surface. The dies 31 and 32 are pressed together until they contact in the center. Each of the meeting faces is provided with a grooves 37, 38 which extends around the stem 23 during the movement. The ends of the tube 25 are supported and slightly forged to maintain their internal diameters at a predetermined value. As the dies are pressed together, however, they form the cavity 12 and shape the conical surfaces 15 and 16 which fit around the seals 17 and 18. Pressing the dies together produces a tight fit between the ball 22 and the sealing elements 17 and 18. In other words, the tube 25 is formed to reduce the diameter of the end portions and to form opposed frusto-conical internal surfaces that match and engage the similar surfaces on the sealing elements and serve to clamp the sealing elements and the ball between them. Gaging plugs 28 and 29 are associated with the dies 31 and 32, respectively, and extend into the end portions of the tube while it is being formed. As a matter of fact, the dies form an internal cylindrical surface which is accurately formed to permit the housing to be soldered to incoming pipes to which the valve is connected. It can be seen, then, that each die has a bore of small diameter to produce on the tube 25 an end portion of small diameter and a bore of large diameter, substantially equal to the outside diameter of the tube, and a frusto-conical transition bore. Each die also has a gaging plug coaxially mounted in the bore of small diameter to maintain the end portion of the housing at a desired internal diameter.

The operation and advantages of the present invention will now be readily understood in view of the above description. The formation of the tube 25 into the finished housing 11 causes a tight clamping of the sealing elements 17 and 18 about the ball 22, so that no leakage takes place. The sealing elements are formed with the usual spherical lip (where they contact the ball) to provide for good sealing that will take place despite substantial use of the valve. The handle 26 is provided with a downwardly-extending leg 39 that contacts the outside of the housing on occasion and allows the ball to be moved 90° from the open to the closed position. Not only can the housing be soldered in the usual way into a coppertube water system and the like, but it can be used over again by applying the blow torch to the fitting and melting the solder for removal of the valve from the system. The use of the conical surfaces 15 and 16 to engage the sealing elements 17 and 18 functions not only provide good sealing against the housing, but also to provide adequate sealing against the ball 22. The selection of the amount of deformation of the housing also serves to select the forces that exist within the valve itself for good operation.

The valve and its manufacture operate best if there is slight press fit of the sealing elements 17 and 18 in the tube 25 before the formation begins. The plugs 28 and 29 on the dies 31 and 32 hold the internal diameter size for the tube and produces a stop shoulder for attaching the tubing of the pipe system in which the valve is inserted. The conical surfaces 15 and 16 can have an angle up to 90°, but the angle cannot be too small; the suggested angle should be at least 23°, otherwise it is possible to extrude the sealing element outwardly of the tube. A 90° bend would involve two operations in forming the housing. The difference between the diameter of the cavity 12 and that of the ends containing the inlet and outlet passages 13 and 14 can be as much as 50°. A suitably-shaped seal around the stem 23 should be used where a round tube is used for the housing; if the area around the aperture 27 is flattened, then a flat washer could be used.

DESCRIPTION OF MODIFIED VALVE

Figure 6:
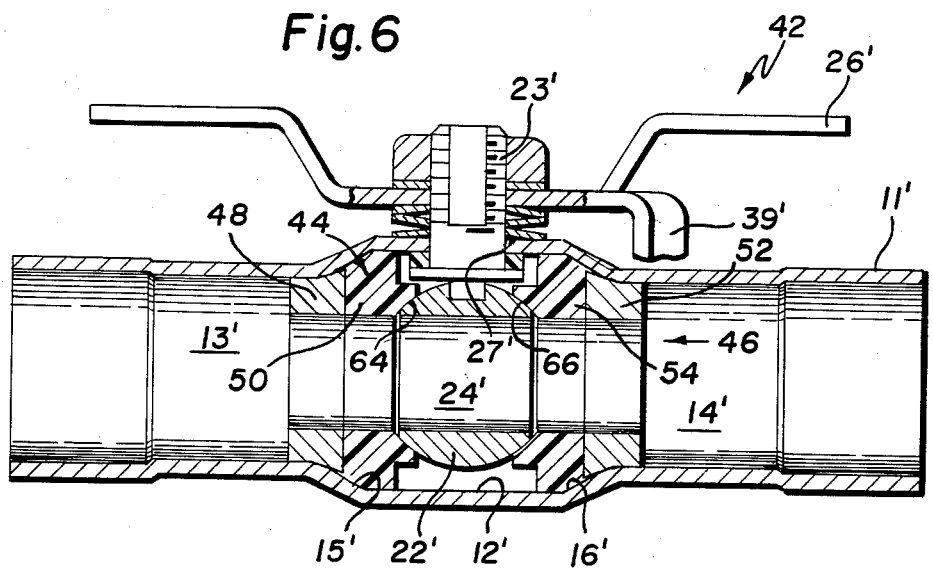
FIG. 6 is a sectional view similar to FIG. 2 showing a two-part modified sealing element.

Referring to FIGS. 6–9, there is shown a modified valve, generally indicated by the reference numeral 42. Referring particularly to FIG. 6, the modified valve 42 is identical to valve 10 in every respect except for the sealing elements. The portions of the valve 42 which are identical to portions of valve 10 are identified with the same reference numerals with the addition of a prime. The first and second sealing elements 17 and 18, respectively, of valve 10 are replaced by first and second sealing elements 44 and 46 in the modified valve 42.

Each of the sealing elements 44 and 46 consist of two parts, a metallic ring part and an elastomeric ring part. The first sealing element 44 consists of a metal ring 48 and an elastomeric sealing ring 50. The second sealing element 46 consists of a second metal retaining ring 52 and a second elastomeric sealing ring 54. One end of the elastomeric sealing ring 50 contains a first ball seat 64 and one end of the elastomeric sealing ring 54 contains a second ball seat 66. The rings 50 and 54 are preferably made of a thermoplastic elastomeric such as Teflon.

Figure 7:
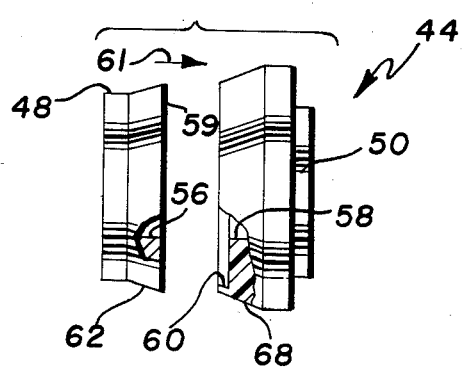
FIG. 7 is an exploded view of one of the modified sealing elements of FIG. 6.

The first and second sealing elements 44 and 46 are identical, so that only one of the sealing elements, namely first sealing element 44, will be described in further detail. Referring particularly to FIG. 7, the first sealing element 44 is shown in the disassembled condition, wherein the rings 48 and 50 are shown as spearate elements. The elastomeric ring 50 has a central bore 58 and a counterbore 60 located at the opposite end of the ring from the first ball seat 64. The elastomeric ring 50 also has a frusto-conical surface 68. The metal ring 48 has a central bore 56 and an outer frusto-conical surface 62 which intersects with a flat end surface 59.

Figure 8:
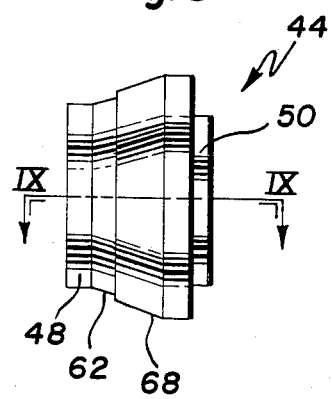
FIG. 8 is a side elevation of the modified sealing element in the assembled condition.
Figure 9:
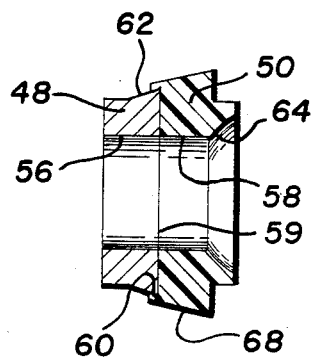
FIG. 9 is a horizontal sectional view of the modified sealing element taken along the line IX—IX of FIG. 8.

The ring portions 48 and 50 of the first sealing element 44 are assembled by placing the end surface 59 of the ring 48 so that it faces the counterbore 60 of the ring 50 as shown in FIG. 7. The ring 48 is advanced toward the ring 50 in the direction of arrow 61, so that the surface 59 is forced into the counterbore 60 in a snap fit as shown in FIGS. 8 and 9. As soon as the ring 48 is inserted within the ring 50, the rings are mechanically interlocked and are treated as a single sealing element.

The assembled sealing elements 44 and 46 are utilized for the construction of the modified valve 42 in the same manner as the sealing elements 17 and 18 of the preferred embodiment. The elements of the valve are assembled in the same manner as shown in FIG. 4 for the valve 10, and the tube portion of the valve is formed as shown in FIG. 5 to clamp the sealing elements and the ball between them, so that the valve 42 assumes the cross-sectional configuration shown in FIG. 6. The modified valve 42 comprises a main housing 11' having a central cavity', an inlet passage 13' at one end of the cavity and an outlet passage 14' at the opposite end of the cavity. An inner frusto-conical surface 15' defines a first transition passage connecting the inlet passage 13' to the cavity 12'. A second inner frusto-conical surface 16' defines a second transition passage which connects the outlet passage 14' to the central cavity 12'. The ball 22' is located in the central cavity 12' and is operatively connected to the stem 23', so that the ball 22' can be rotated from the closed position in which the bore 24' of the ball is out of alignment with the inlet and outlet passages 13' and 14', respectively, to an open position in which the bore 24' is aligned with the inlet and outlet passages. The ball 22' is also in sealing engagement with the first and second ball seats 64 and 66, respectively. The outer frusto-conical surfaces 62 and 68 of each of the sealing elements 44 and 46 are in engagement with the first and second inner frusto-conical surfaces 15' and 16', respectively. During formation of the housing 11', the elastomeric portion of each sealing element is compressed, so that the outer frusto-conical surfaces 68 and 62 are substantially aligned along the inner frusto-conical surface of their respective transition passage. This further locks the metal ring portion to the elastomeric ring portion of the sealing element and firmly locks the sealing element as a whole within the transition passage. The metal ring portion of the sealing element provides a firm locating base for the elastomeric ring portion of the sealing element to maintain a firm sealing relationship between the ball and each of the ball seats. The metal ring portion of the sealing element also provides a heat sink to protect the elastomeric portion of the sealing element from damage due to high heat which is developed during soldering of the valve to a flow line.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Valve comprising:
(a) a main unitary housing which is integrally formed of malleable metal, said housing having a circular central cavity, a circular inlet passage at one end of the cavity and a circular outlet passage at the opposite end of the cavity, each of said passages having a substantially smaller cross-sectional area than said cavity, said housing having a first inner frusto-conical surface which defines a first transition passage between the central cavity and the inlet passage, and a second inner frusto-conical surface which defines a second transition passage between the central cavity and the outlet passage,
(b) a flow control ball located in said cavity and having a bore,
(c) a first retaining ring located in a fixed position between the inlet passage and said ball and spaced from the ball, at least a portion of each of said first retaining ring being located in said first transition passage and extending to the outer limits of said first transition passage,
(d) a seond retaining ring located in a fixed position between the outlet passage and said ball and spaced from the ball, at least a portion of each of said second retaining ring being located in said second transition passage and extending to the outer limits of said second transition passage,
(e) a first sealing ring of elastomeric material located in the cavity between the first retaining ring and the ball, one side of said first sealing ring being in engagement with said first retaining ring and the opposite side of said first sealing ring having a first ball seat which is in sealing engagement with said ball, at least a portion of said first sealing ring being located in said first transition passage extending to the outer limits of said first transition passage to form with the ball, a complete seal between the cavity and the inlet passage,
(f) a second sealing ring of elastomeric material located in the cavity between the second retaining ring and the ball, one side of said second sealing ring being in engagement with said second retaining ring and the opposite side of said second sealing ring having a second ball seat which is in sealing engagement with said ball, at least a portion of said second sealing ring being located in said second transition passage extending to the outer limits of said second transition passage to form with the ball, a complete seal between the cavity and the outlet passage, each of said first and second retaining rings and said first and second sealing rings having an outer frusto-conical surface for engaging the corresponding portions of said first and second frusto-conical inner surfaces, and
(g) actuating means for rotating the ball from a closed position in which the bore of the ball is out of alignment with said inlet and outlet passages to an open position in which the bore of the ball is aligned with said inlet and outlet passages.

2. Valve as recited in claim 1, wherein said first and second retaining rings are made of metal.

* * * * *